United States Patent [19]

Callens

[11] 3,912,872

[45] Oct. 14, 1975

[54] DATA TRANSMISSION PROCESS

[75] Inventor: Paul Raymond Callens, Cagnes-sur-Mer, France

[73] Assignee: International Business Machines Corporation, Armonk, N.Y.

[22] Filed: Sept. 26, 1974

[21] Appl. No.: 509,605

[30] Foreign Application Priority Data

Sept. 28, 1973 France .............................. 73.35909

[52] U.S. Cl. ............................ 179/15 BA; 179/15 A

[51] Int. Cl.[2] ............................................ H04J 3/12

[58] Field of Search ......... 179/15 A, 15 BA, 15 BY, 179/15 BC

[56] References Cited

UNITED STATES PATENTS

| | | | |
|---|---|---|---|
| 3,394,224 | 7/1968 | Helm | 179/15 BC |
| 3,718,768 | 2/1973 | Abramson | 179/15 BA |
| 3,787,627 | 1/1974 | Abramson | 179/15 BA |
| 3,804,987 | 4/1974 | Cooper | 179/15 A |
| 3,809,817 | 5/1974 | Gill | 179/15 BA |

*Primary Examiner*—Ralph D. Blakeslee
*Attorney, Agent, or Firm*—Karl O. Hesse

[57] ABSTRACT

A multiplexing method which utilizes each data bit transmitted to convey both message information and multiplex address information. A memory having sufficient bit position capacity to store a binary number capable of uniquely identifying each multiplexed message source or sink is connected at each point of communication in a point-to-point, multidrop, loop, or other communication link. As information is transmitted across the communication link, it is also shifted through or cyclically written into each memory. One or more of the data bits stored in a memory at any instant in time are used as an address, to identify the source or sink, from or to which, the next data bit or plurality of bits is to be multiplexed.

8 Claims, 7 Drawing Figures

DATA TRANSMISSION PROCESS

BACKGROUND OF THE INVENTION

1. Field of the Invention

This invention concerns a time-division multiplex data transmission method and apparatus for performing the method. More particularly, it concerns a time-division multiplex process where in the transmitted data is utilized as address information as well as message data.

2. Description of the Prior Art

The improvements obtained these last few years in the teleprocessing field have entailed the creation of more and more complex data transmission networks. In those systems, the data coming from a plurality of terminals is routed towards a central processing unit which is often remotely positioned with respect to each of the terminals. A separate communication line from each of the terminals to the central processing unit would incur tremendous expense with respect to the transmission circuits and would make this solution very costly.

In order to overcome this drawback, intermediate systems are provided which gather the data coming from a plurality of terminals and, then, retransmit the combined data signals to the central processing unit over a single transmission line. This is the so-called data multiplexing process or method.

A well-known multiplexing process consists in multiplexing the data in the form of messages. According to this process, the central processing unit polls the time-multiplexing device at regular intervals. The multiplexing device gathers the messages coming from the terminals and, as soon as a message is gathered, it responds to the central unit by transmitting the complete message thereto which is preceded by the address of the source terminal. Such a method, therefore, requires the use of a time-multiplexing device with a large capacity memory.

Another well-known time-multiplexing process consists in multiplexing the data in the form of characters. According to this process, the data coming from the central processing unit are grouped within a fixed-length time frame divided into as many slots as there are terminals. Each time slot is allocated to a particular terminal and, thus, when the frame is received by the multiplexing device, the latter transfers the characters which are in the slots to the corresponding respective terminals. Conversely, a frame is formed before its being sent to the central unit by transferring the characters coming from the terminals into the slots which are allocated thereto. In such a processs, no addressing operation is necessary since the same slot in a frame is always allocated to a same terminal; however, frame synchronizing information is needed to locate the first slot of each frame. On the other hand, since the terminals do not always have data to be transmitted, or to be received, only some of the slots will have a data character. Thus, during low-traffic hours the data rate of the frame may fall down to 20%. Therefore, permanent time slot allocation yields a relatively low transmission efficiency.

Another well-known time-multiplexing process is the frame multiplexing process herein the time slots are dynamically allocated. In such a method, a slot can be allocated to any terminal when it is free and, therefore, in a frame, the number of the slots is less than the number of terminals. The terminal which requires the allocation of a slot must, first, send its address thereinto in order to indicate to other terminals that this slot is no long idle. Thereafter, it sends a data character and, then, its address again. In such a process, the time during which information is transmitted over the line, therefore, is reduced because of the bandwidth required for address transmission.

In a general manner, it can be said that, for each of the well-known time-multiplexing processes, the capacity of the transmission line, expressed in data units (bits) per second, is reduced by a large quantity due to the presence of address characters or frame synchronization characters which must be transmitted in addition to the data.

SUMMARY OF THE INVENTION

Therefore, one object of this invention is to provide for a more general time-division multiplexing process wherein the communication channel can be coupled at an optimal rate.

Another object of this invention is to provide for a time-division multiplexing process wherein the transmission of address characters in addition to the data character, is not necessary.

Still another object of this invention is to provide for a time-division miltiplexing process wherein the transmission of frame synchronization characters in addition to the data characters, is not necessary.

Still another object of this invention is to provide an improved data transmission system for transmitting data from a plurality data sources to users by means of a more efficient time-division multiplexing process.

These objects, and others which will become apparent from a reading of the specification, are achieved by providing a first memory at a multiplexor for storing a finite quantity of multiplexed data and a first decoder means for establishing a univocal correspondence between the contents of said first memory and the address information which identifies the data sources, and a second memory at a demultiplexor for storing the same quantity of data as stored in said first memory and a second decoder means for establishing the univocal correspondence between the contents of said second memory and the addresses of the corresponding receivers.

A PREFERRED EMBODIMENT OF THE INVENTION

Figure 1:
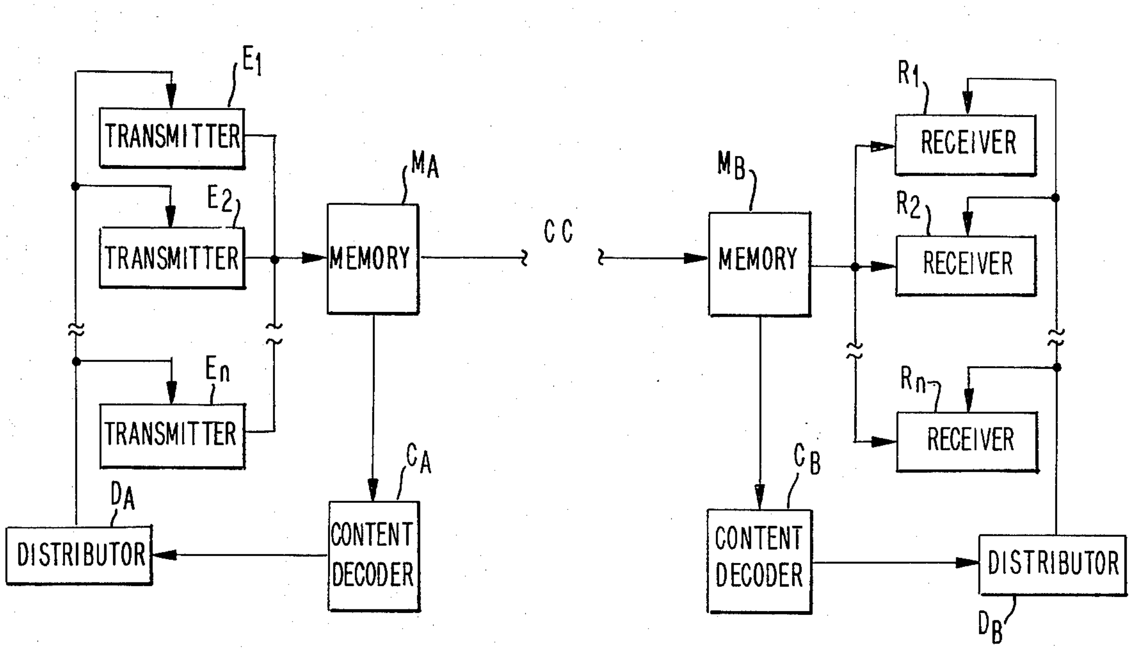
FIG. 1, is a schematic diagram of transmission system embodying the process of this invention.

FIG. 1 shows a preferred embodiment of the process according to this invention.

The data transmission system shown in FIG. 1 makes it possible to transmit data at either a regular or an irregular rate from sources or transmitters $E_1$ through $E_n$ located at a location A to users, or receivers, $R_1$ through $R_n$ located at a location B, through a common communication channel CC.

The transmitted data are quite general data and can be, for instance, digital data of the binary type (1 or 0), or digital data of the ternary type 1, 0, −1), or digital data composed of a plurality of data elements of the binary type.

According to this invention, the system includes a memory $M_A$ at A and a memory $M_B$, at B. The purpose of these two memories is to store a predetermined number of data elements depending upon the number of the transmitters and receivers, respectively, as well as on the operation or data rate of these transmitters and receivers.

In addition, this system includes a content decoder means $C_A$ for establishing a univocal correspondence between the contents of memory $M_A$ and the address of one of the transmitters E, and a content decoder means $C_B$ for establishing a univocal correspondence between the contents of memory $M_B$ and the address of one of the receivers R.

On the transmission side A, the data that will be sent over the communication channel, at instant *t*, comes from a transmitter E, determined by address $A_t$ corresponding to the contents of memory $M_A$ and modifies the contents thereof. At instant $t+1$, the data which will be sent over the communication channel comes from the same or another transmitter E, determined by address $A_{t+1}$ corresponding to the new contents of memory $M_A$ at this instant $t+1$. This data, in its turn, is loaded into memory $M_A$ and modifies again the contents thereof, and so on.

On the receiver side B, the data received on the communication channel at a given instant $(t+\Delta)$, $\Delta$ being a delay depending on the characteristics of the communication channel, is sent to a receiver R determined by address $B_{t+\Delta}$ corresponding to the contents of memory $M_B$ at this instant $(t+\Delta)$, which activates distributor $D_B$ to gate a receiver R. This data is also loaded into memory $M_B$ and modifies the contents thereof. At instant $(t+\Delta+1)$, the data received on the communication channel is sent to a receiver R determined by address $B_{(t+\Delta+1)}$ corresponding to the new contents in memory $M_B$ at this instant $(t+\delta+1)$. This data, in its turn, is loaded into memory $M_B$ and modifies again the contents thereof, and so on. Content decoding means $C_A$ and $C_B$ operate, as decoders causing a transmitter address and a receiver address to correspond to each different configuration of the contents in memories $M_A$ and $M_B$, respectively.

It should be noted that it is not necessary that each address corresponds to a different configuration of the contents in memories $M_A$ and $M_B$ and that, in the case when the number of the possible different configurations of the contents in memories $M_A$ and $M_B$ is larger than the number of the transmitters and receivers, respectively, a conversion table or an algorithm will make it possible to cause a plurality of different configurations to correspond to each transmitter and to each receiver thereby allowing higher data rates in some channels than in others. This relationship is called univocal.

In order that the transmitters and the receivers be, each, addressed at the end of an average time length defined be the application involved, it suffices that the successive codes formed of the contents in memories $M_A$ and $M_B$ be equiprobable. Such a condition is fulfilled very often in the data transmission processes because of the purely random nature of the data to be transmitted. On the other hand if the data is not sufficiently random, the use of a well-known "scrambling" technique at the input to memory $M_A$ and input and output of communication channel CC such as taught in "Linear Sequential Switching Circuits," W. H. Kantz, Holden Day Inc. 1965 satisfies such a condition, if need be.

The information successively transmitted over the communication channel, according to this invention is, therefore, mainly formed of data elements and the system requires neither separate address data, nor the creation of any frame synchronizing characters.

Figure 2C:
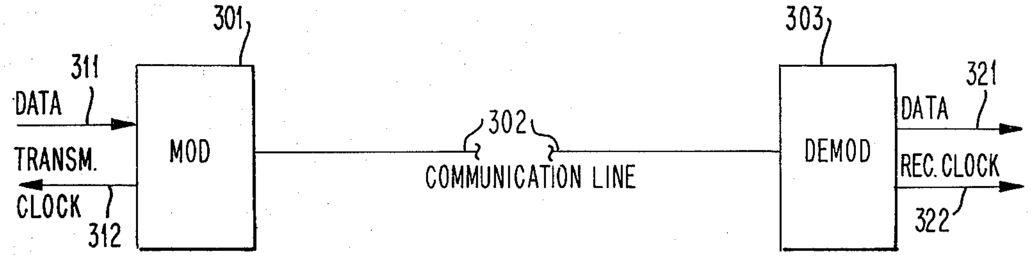
FIG. 2C, is a more detailed view of the communication channel of the transmission system shown in FIG. 1.
Figure 2A:
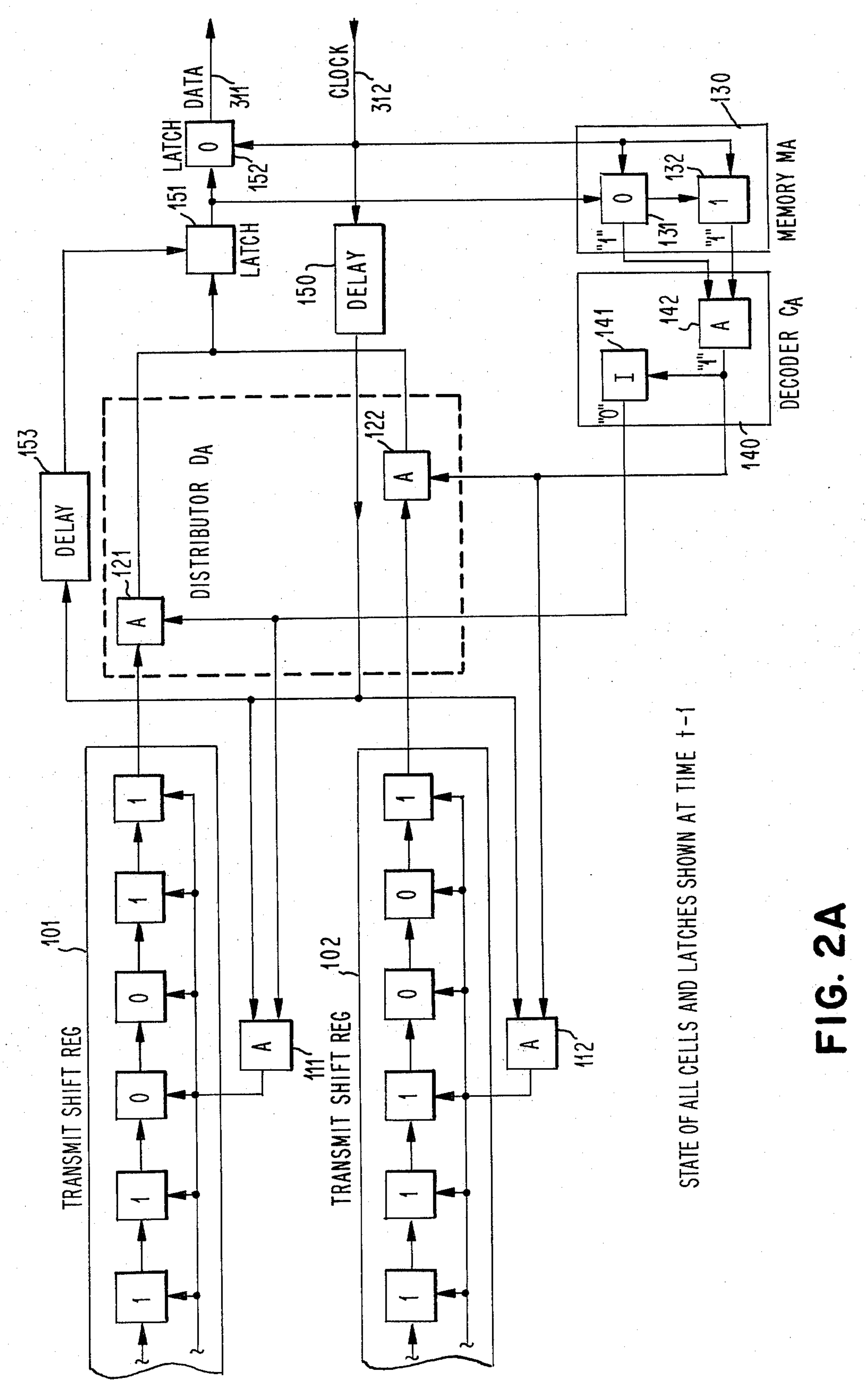
FIG. 2A, is a more detailed view of the transmitter portion of the transmission system shown in FIG. 1.
Figure 2B:
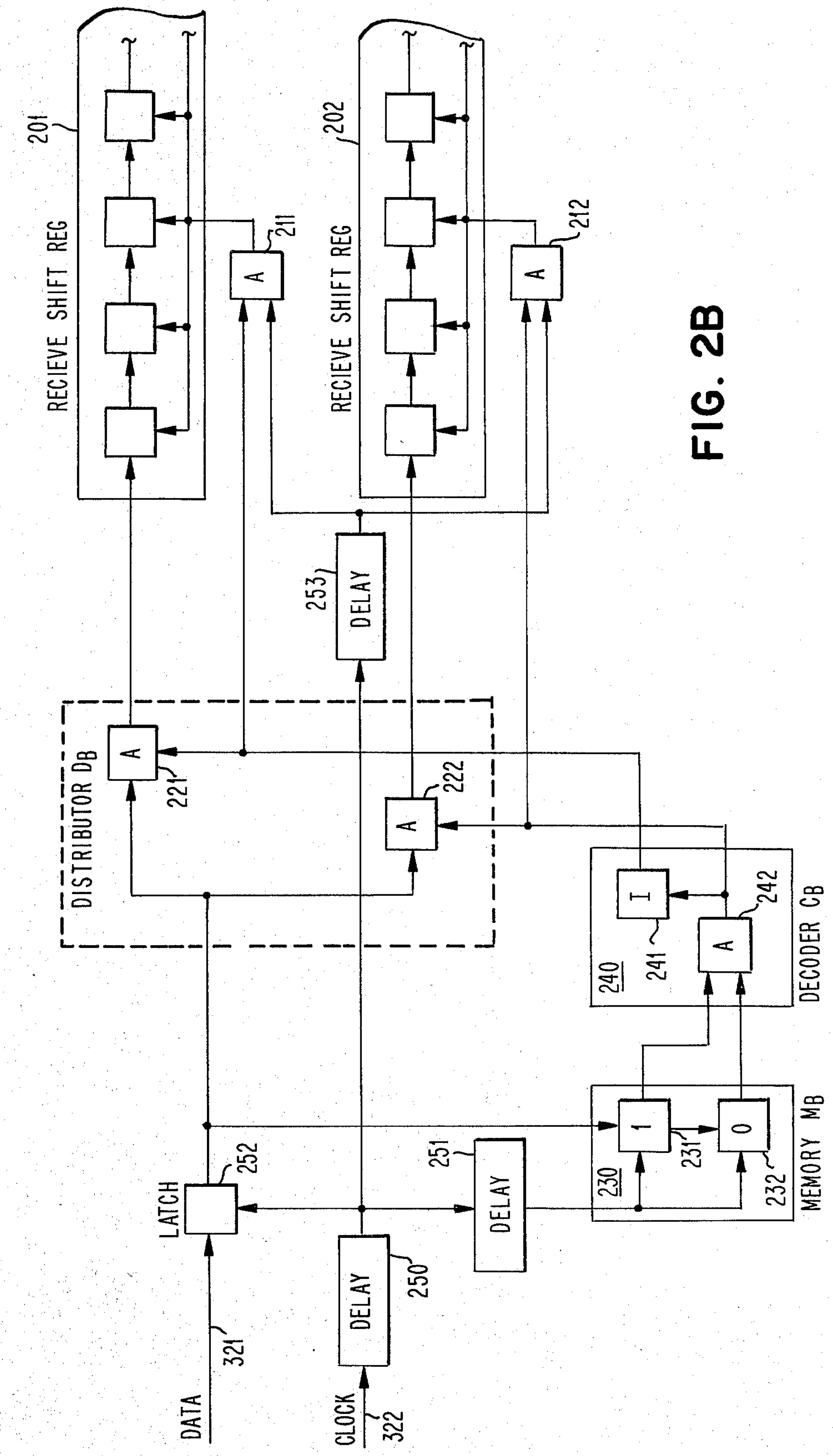
FIG. 2B, is a more detailed view of the receiver portion of the transmission system shown in FIG. 1.

FIG. 2A, 2B, 2C show, in a more detailed form, the different parts of the data transmission system shown in FIG. 1 as the preferred embodiment of this invention.

FIG. 2A shows the transmission part of the data transmission system wherein two of the transmitters *E*, shown in FIG. 1, are represented, by way of an example, as the two shift registers 101 and 102.

Distributor $D_A$, shown in FIG. 1, is represented by AND gates 121 and 122. Memory $M_A$, shown in FIG. 1, is represented by shift register 130 which, by way of an example, comprises cells 131 and 132, the contents of which, therefore, can define $2^2=4$ different configurations.

Coding means, shown in FIG. 1, is represented by circuit 140.

FIG. 2B shows the reception part of the data transmission system wherein receivers R, shown in FIG. 1, are represented by two shift registers 201 and 202.

Distributor $D_B$, shown in FIG. 1, is represented by AND gates 221 and 222.

Memory $M_B$, shown in FIG. 1, is represented by shift register 230 and is comprised, by way of an example, of two cells 231 and 232 and which, therefore, can present $2^2=4$ different configurations.

Coding means, $C_B$, shown in FIG. 1, is represented by circuit 240.

FIG. 2C shows the communication channel part of the transmission system. It represents a modulator 301, a telephone line 302 and a demodulator 303.

OPERATION OF THE PREFERRED EMBODIMENT

Figure 3A:
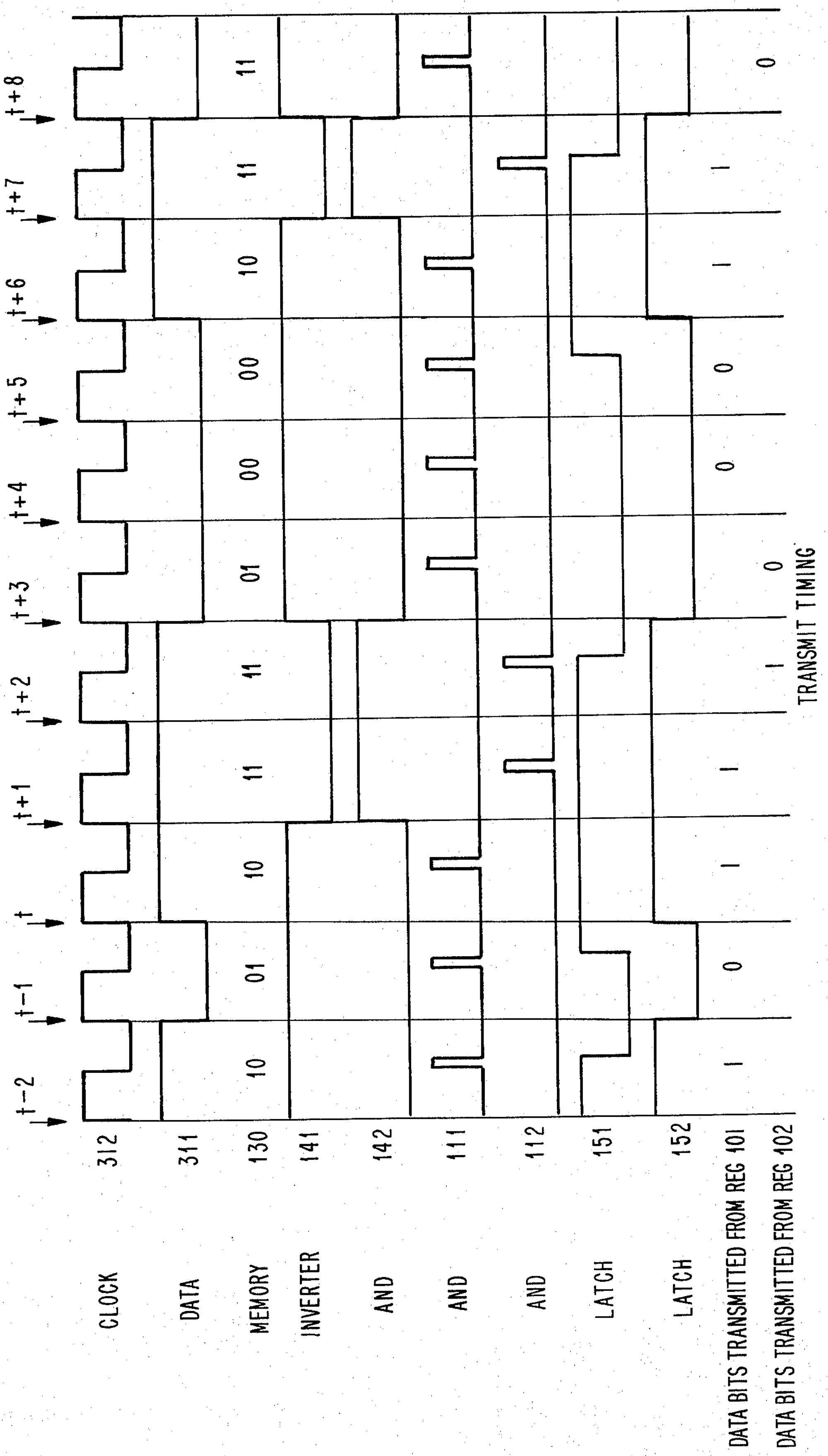
FIG. 3A, is a time diagram for the transmission operation.

The operation of the data transmission system will now be described with reference to FIGS. 2A, 2B, 2C, and with reference to FIGS. 3A and 3C which show the timing diagrams for the transmission and reception parts, respectively, wherein the conditions of the different elements of the system are shown for a succession of times of data units, or bit times, *t*.

In order to make the description more clear, it will be supposed that, at time *t*-1, the contents of the transmitters shown by shift registers 101 and 102 is 110011 and 111001, of memory 130 is 01, and of latch 152 is 0 as shown in FIG. 2A.

In addition, it will be supposed that the decoding means 140 in FIG. 2A and 240 in FIG. 2B are such that they will cause registers 101 and 201 to be controlled by configuratins 00, 10, 01 of the contents in memories 130 and 230, respectively and registers 102 and 202, to be controlled by configurations 11 of the contents in memories 130 and 230, respectively. This hypothetical example corresponds to the case of two transmitters with one having an operating rate which is three times that of the other since, statistically, it will have to be allowed or controlled to send three times more often than the other when the decoding means is activated by random data. Likewise, one of the receivers will operate with a rate which will be three times that of the other.

At time $t$-1, modulator 301 produces a clock signal over line 312 at the transmission frequency over the transmission line. The transmission frequency over the line, may be, for instance, 1200Hz. Therefore, the clock signal will be a square signal at a frequency of 1200Hz.

Each leading edge of the clock signal received over line 312 gates the latch 152 thereby causing the bit stored in latch 152 to be sent. In the chosen example, a bit 0, will be transmitted over line 311. This also entails the shift of the contents in shift register 130, the contents of which are shown to start with a 01.

Then, the clock signal is delayed and shaped by delay circuit an monostable multivibrator 150 in order to have a $t/2$ delay, i.e., half of a bit time. The narrow pulses which will generate the shift operation in shift registers 101 and 102 are therefore delayed by a phase shift of 180°.

Registers 101 and 102 are shifted by means of AND gates 111 and 112, one of the inputs of which is the $t/2$ delayed and shaped clock signal, and the other input being the output of decoding circuit 140. In the chosen example and according to the above hypothesis, circuit 140 includes AND gate 142 and inverter 141. AND gate 142 generates a signal 1 when the contents of shift register 130 is 1 1 and a signal 0 in any other case. Consequently, inverter 141 generates a signal 1 when the contents in shift register is 0 0, 0 1 or 1 0, and a signal 0 when the contents in shift register 130 is 1 1. In FIG. 2A, when AND circuit 142 generates a signal 0, which is inverted to a 1 in inverter 141, gate 111 opens and authorizes the shift of transmitter register 101 at the $t/2$ delayed clock time.

During this time, the output signal from inverter 141 has opened gate 121 allowing the bit which is in the last cell of register 101, namely a 1 in this example, to be presented at the input of latch 151 wherein it will be loaded by the $t/2$ delayed clock signal which has been delayed again by a fraction of the bit time by means of delay circuit 153.

This bit is then presented to latch 152 wherein it will be loaded by the following leading edge of the next clock signal; it will also be presented to the input of shift register 130 wherein it will be loaded by the same positive leading edge of the next clock signal. For each leading edge of the clock signal, a binary value coming from one of registers 101 or 102 will be transmitted over the line which will be maintained to such a value until the positive leading edge of the following clock signal, as shown in the timing diagram in FIG. 3A.

Turning now to the receiving end of the system, demodulator 303 shown in FIG. 2C produces a clock signal over line 322, at the transmission frequency of the line. This clock signal is also delayed a first time and shaped into a narrow pulse by delay circuit and monostable multivibrator 250 shown in FIG. 2B in order to provide a $t/2$ delay for those pulses which will be utilized to sample the data at the output 321 of the demodulator and to load them into latch 252 during each bit time.

The clock signal is $t/2$ delayed a second time by delay circuit 251 in order to generate the shift pulses for shift memory register 230.

Figure 3B:
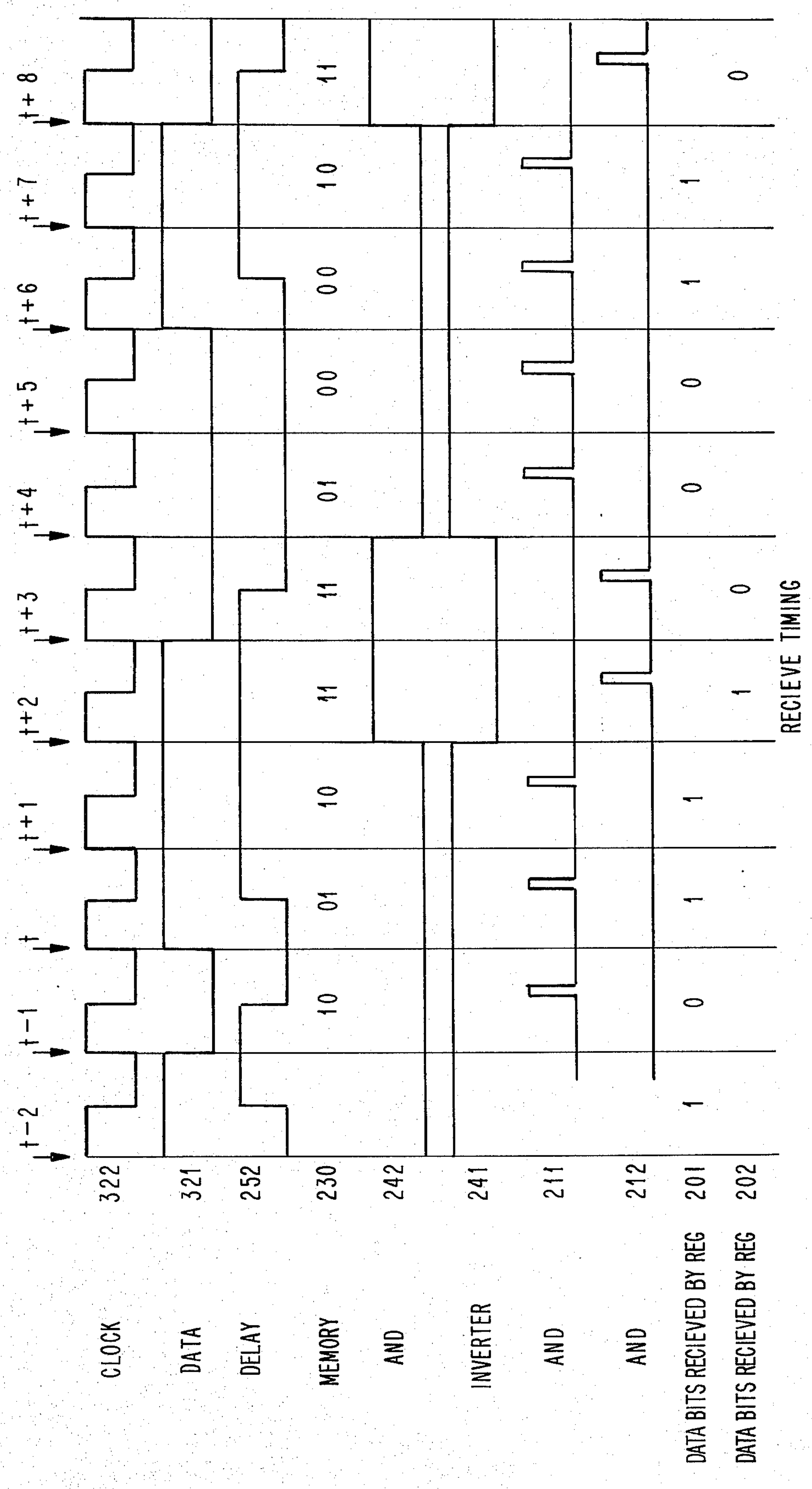
FIG. 3B, is a timing diagram for the reception operation.

Delay circuit 253, then, generates another delay corresponding responding to a fraction of the bit time in order to control the shift operation of shift registers 201 and 202. For the rest of the receiver operation, the data flow is the same as for the transmission, as shown in the timing diagram of FIG. 3B.

Figure 4:
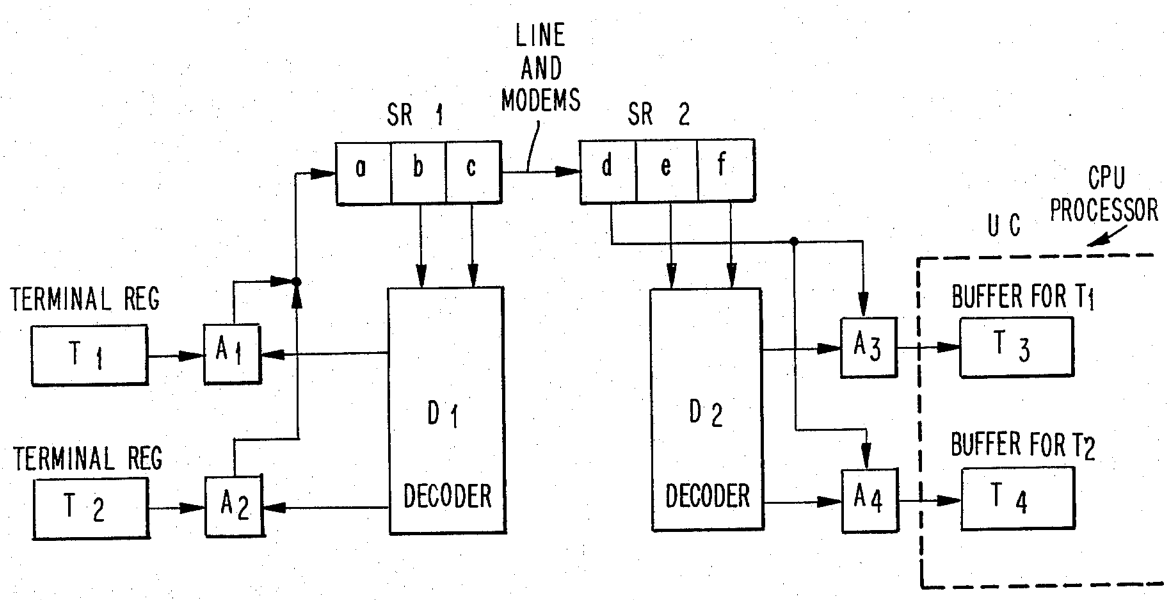
FIG. 4 is another embodiment of the invention.

FIG. 4 shows another particularly advantageous embodiment according to this invention.

For example, it will be supposed that two terminals represented by two buffer registers $T_1$ and $T_2$ transmitting at rates of 3600 and 1200 bauds, respectively, have to be connected to buffer registers $T_3$ and $T_4$ of the central processing unit UC of a computer.

In this example, and according to this invention, a series shift register SR1 is inserted, into the data path on the terminal side, and a series shift register SR2 is inserted into the data path on the central unit side. Registers SR1 and SR2 are 3 cell or 3 bit position registers. The bits leaving the right-hand cell C of SR1 are transmitted to the left-hand cell D of SR2. It will now be supposed that two of these bit positions, namely $b$, $c$ and $e$, $f$, correspond, according to a data table, to the address of a transmitter and a receiver, respectively, and that the third of these bit positions, namely $a$ and $d$, contains a bit coming from the transmitter or intended for the receiver, the address of which corresponds to the bits in cells $b$, $c$, and $e$, $f$, respectively.

It will be supposed that, on the terminal side, said data table causes data configurations 00, 01, 10 to correspond to terminal $T_1$ and data configuration 11, to terminal $T_2$. Each time a configuration 00, 01, 10 is decoded by decoder $D_1$, a pulse, for instance, a clock pulse coming from a modem, not shown, will load the last bit of terminal $T_1$ into the left-hand cell a of register SR1 through gate $A_1$, and each time a configuration 11 is decoded by decoder $D_1$, a clock pulse will load the last bit of terminal $T_2$ into the left-hand cell a of register SR1, through gate $A_2$.

Thereafter, it will be supposed that, on the UC side, said data table causes data configurations 00, 01, 10 to correspond to buffer register $T_3$ of unit UC, and configuration 11, to buffer register $T_4$ of unit UC. Each time a configuration 00, 01, 10 is decoded by decoder $D_2$, a pulse for instance, a clock pulse, coming from a modem such as modem 303 which would be connected between SR1 and SR2, will load the bit in the left-hand cell $d$ of register SR2 into buffer $T_3$ through gate $A_3$, and, each time a configuration 11 is decoded by decoder $D_2$, a clock pulse will load the bit in the left-hand cell of SR2 into buffer register $T_4$, through gate $A_4$.

By way of example, it will be supposed that buffer registers $T_1$ and $T_2$ contain the following bits:

$T_1$ = 110001110010101110011010001

$T_2$ = 010010011010011100010101 and that the correspondence tables are those which are mentioned above.

The flow of the bits into SR1 and SR2 can be described as follows:

It will be supposed that, in the initial or starting state, the contents of the two right-hand cells of SR1 $b$ and $c$ is OX where X is either a 0 or a 1 and the O came from $T_1$. For this configuration, decoder $D_1$ causes a clock pulse to be applied to gate $A_1$ and the last bit of $T_1$, namely bit 0, to be loaded into the left-hand cell of SR1, causes SR1 to be shifted and cuases the bit in the right-hand cell *c*, namely bit X, to be sent over the transmission line. The contents of the right cells *b* and *c* or SR1 are now 00. For this configuration, decoder $D_1$ again causes a clock pulse to be applied to gate $A_1$, and the last bit of $T_1$, namely a 1, to be loaded into the left cell of SR1, and so on. As to SR2, the operation is symmetrical, with the bit in the left cell *d* of SR2 being sent into the buffer register $T_3$ and $T_4$ having the address which corresponds to the contents of the two right cells *e* and *f* of SR2.

Data flow for this example through memories SR1 and SR2 is shown in table 1, where ADDR is the address of buffer register $T_1$, $T_2$, or $T_3$, $T_4$ identified by the data bits in the two right most bit positions *b*, *c* or *e*, *f* of shift register memories SR1 and SR2 respectively. An X signifies an unknown value.

TABLE I

| SR1 | | SR2 | | SR1 | | SR2 | |
|---|---|---|---|---|---|---|---|
| ADDR | DATA | ADDR | DATA | ADDR | DATA | ADDR | DATA |
| T1 | 00X | X | XXX | T1 | 101 | T3 | 110 |
| T1 | 100 | X | XXX | T1 | 010 | T4 | 111 |
| T1 | 010 | X | 0XX | T1 | 101 | T4 | 011 |
| T1 | 001 | T3 | 00X | T1 | 010 | T3 | 101 |
| T1 | 000 | T3 | 100 | T1 | 101 | T3 | 010 |
| T1 | 100 | T3 | 010 | T1 | 010 | T3 | 010 |
| T1 | 010 | T3 | 001 | T1 | 001 | T3 | 010 |
| T1 | 101 | T3 | 000 | T1 | 100 | T3 | 101 |
| T1 | 110 | T3 | 100 | T1 | 110 | T3 | 010 |
| T2 | 111 | T3 | 010 | T2 | 111 | T3 | 001 |
| T2 | 011 | T3 | 101 | T2 | 011 | T3 | 100 |
| T1 | 001 | T3 | 110 | T1 | 101 | T3 | 110 |
| T1 | 000 | T4 | 111 | T1 | 010 | T4 | 111 |
| T1 | 100 | T4 | 011 | T1 | 001 | T4 | 011 |
| T1 | 110 | T3 | 001 | T1 | 000 | T3 | 101 |
| T2 | 111 | T3 | 000 | T1 | 100 | T3 | 010 |
| T2 | 011 | T3 | 100 | T1 | 110 | T3 | 001 |
| | | | | T2 | 011 | T3 | 000 |

Table II shows the same data flow in graphical form with clock cycles on the horizontal axis and data bits from the communication line into cell *d* of SR2, and data bits passing through A3 or A4 into T3 or T4 respectively on the vertical axis.

TABLE II

```
LINE ...011000010111001010101110001110100010O
A3......1100001..110010101..1100..1101000100
A4.....0.......01.........01...01..........
```

An interesting advantage of the multiplexing method oof this invention is that if a terminal, such as terminal T1 of the foregoing example, has no data to transmit, the terminal can immediately return the communication line to another terminal by merely transmitting a data pattern representative of the address of the other terminal. For example if, T1 has no data to transmit, it can send a binary 1 bit whenever the data pattern in cells *b* and *c* of SR1 cause T1 to transmit. When the binary 1 bits are demultiplexed at T3, the continuous binary 1 bits will be recognized as null data and ignored but the binary 1 bits will have served the purpose of giving T2 the opportunity to transmit. Likewise if T2 had no data to transmit, binary 0 bits would be sent to T4 which would be recognized as null data by the computer CU while serving to give T1 the opportunity to transmit to T3. In this example of Tables I and II, it is clear; according to the assumed table of decode status mentioned previously, that $T_1$ transmits about three times more bits than $T_2$, which, indeed, corresponds to the hypothesis mentioned above.

Though the configuration disclosed in the foregoing, embodiments are point-to-point configurations, other types of configurations for use in data transmission systems are possible, for example multipoint configurations or loop configurations.

It is clear that the preceding description has only been given as an unrestrictive example and that numerous alternatives may be considered without departing from the spirit and scope of the invention. For example, the shift register memory apparatus of the preferred embodiment may be replaced by a read write array type memory which is cyclically addressed by a memory address count which is in turn incremented by a delayed clock signal such as the output of delay circuit 150. Also the method of the preferred embodiment may be obviously expanded by one of ordinary skill in the art of data communications, so as to multiplex messages by pluralities of bits, such as byte by byte or binary coded decimal characters as well as the bit by bit method shown for the sake of simplicity in the preferred embodiment.

What is claimed is:

1. The method of multiplexing data from a plurality of sources comprising the steps of:

a. storing a plurality of previously multiplexed data bits;

b. decoding said stored data bits as an address of one of said sources of data bits to be multiplexed;

c. multiplexing at least one data bit from said one of said sources;

d. storing said at least one data bit multiplexed in place of an equal number of previously stored data bits and repeating steps (*b*), (*c*) and (*d*).

2. The method of demultiplexing data comprising the steps of:

a. receiving at least one data bit to be routed to one of a plurality of receivers;

b. decoding a plurality of previously received data bits as an address of one of said plurality of receivers;

c. routing said received at least one data bit to the receiver of said plurality of receivers identified by said address;

d. replacing at least one of said plurality of previously received data bits with said at least one data bit and repeating steps (*b*), (*c*) and (*d*).

3. A data transmission system including a common communication channel between a plurality of data sources and a plurality of data receivers wherein the improvement comprises:

a first memory;

first decoding means connected to said first memory for establishing a univocal correspondence between data in said first memory and addresses of said plurality of sources;

multiplexing means connected to each of said plurality of sources, to said decoding means, to said communication channel, and to said first memory for gating data from one of said plurality of sources identified by said first decoding means onto said communication channel and into said first memory;

a second memory;

second decoding means connected to said second memory for establishing said univocal correspondence between data in said second memory and addresses of said plurality of data receivers;

demultiplexing means connected to said communication channel, to said second decoding means, to said second memory, and to each of said receivers for gating data from said communication channel into said second memory and to one of said plurality of data receivers identified by said second decoding means.

4. The data transmission system of claim 3 wherein said first memory has a binary bit capacity *n* capable of defining $2^n$ unique addresses, and wherein less than $2^n$ data sources are connected to said multiplexing means and at least one of said data sources is identified by more than one unique address thereby allowing said at least one of said data sources to transmit at a rate greater than others of said plurality of data sources.

5. The data transmission system of claim 4 wherein said second memory has a binary bit capacity n capable of defining $2^n$ unique addressses, and wherein less than $2^n$ data receivers are connected to said multiplexing means and at least one of said data receivers is identified by more than one unique address thereby allowing said at least one of said data receivers to transmit at a rate greater than others of said plurality of data receivers.

6. The data transmission system of claim 3 wherein each of said memories is a shift register.

7. The data transmission system of claim 3 wherein said multiplexing means further comprises:

a different first AND gate connected to each of said plurality of data sources, the outputs of each of said first AND gates connected to said communication channel and to said first memory;

and wherein said demultiplexing means further comprises:

a different second AND gate connected at an output to each of said plurality of data receivers, an input of each of said second AND gates being connected to an output of said communication channel.

8. A data transmission system including a common communication channel betweenn a plurality of data sources and a plurality of data receivers wherein the improvement comprises:

a first shifting memory, the output of the last stage of said first memory being connected to said communication channel;

first decoding means connected to said first memory for establishing a univocal correspondence between data in said first memory and addresses of said plurality of sources;

multiplexing means connected to each of said plurality of sources, to said decoding means, and to said first memory for gating data from one of said plurality of sources identified by said first decoding means into said first memory;

a second shifting memory having a first stage input connected to said communication channel;

second decoding means connected to said second memory for establishing said univocal correspondence between data in said second memory and addresses of said plurality of data receivers;

demultiplexing means connected to said second decoding means, to an output of said first stage of said second memory, and to each of said receivers for gating data from said communication channel to one of said plurality of data receivers identified by said second decoding means.

* * * * *